April 30, 1968  C. A. GOVATSOS  3,381,076
METHOD FOR SHAPING AND FORMING SELECTED
PORTIONS OF A FOAMED SHEET
Filed Nov. 23, 1964   3 Sheets-Sheet 1

INVENTOR.
CHARLES A. GOVATSOS
BY Morse, Altman & Oates
ATTORNEYS

April 30, 1968 C. A. GOVATSOS 3,381,076
METHOD FOR SHAPING AND FORMING SELECTED
PORTIONS OF A FOAMED SHEET
Filed Nov. 23, 1964 3 Sheets-Sheet 2

*INVENTOR.*
CHARLES A. GOVATSOS
BY Morse, Altman & Oates
ATTORNEYS

April 30, 1968 C. A. GOVATSOS 3,381,076
METHOD FOR SHAPING AND FORMING SELECTED
PORTIONS OF A FOAMED SHEET
Filed Nov. 23, 1964 3 Sheets-Sheet 3

INVENTOR.
CHARLES A. GOVATSOS
BY
Morse, Altman & Oates
ATTORNEYS

United States Patent Office 3,381,076
Patented Apr. 30, 1968

3,381,076
METHOD FOR SHAPING AND FORMING
SELECTED PORTIONS OF A FOAMED
SHEET
Charles A. Govatsos, 33 Westgate Road,
Wellesley, Mass. 02181
Filed Nov. 23, 1964, Ser. No. 413,215
4 Claims. (Cl. 264—321)

ABSTRACT OF THE DISCLOSURE

Heat expandable foamed plastic trays are formed with marginal reinforcing ribs by applying heat to the edge portion only of the tray to produce a post expansion of the edge portion. The application of localized heat will increase the thickness of the edge portion with respect to the remaining portion of the tray thereby providing greater strength and stability to the tray.

---

Figure 1:
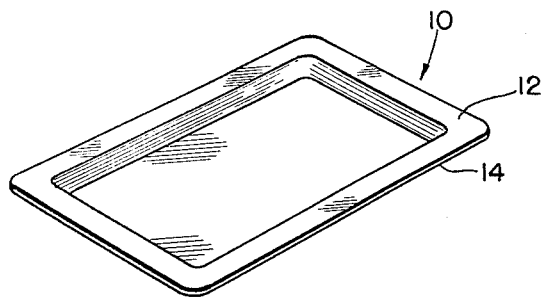

This invention relates generally to the manufacture of rigid foamed plastic products and more particularly is directed towards a novel method of manufacturing foamed plastic sheet article of improved lateral stability and a new and improved method for forming a bead along the edge of a foamed plastic article by means of post expansion of the edge portion.

Foamed plastics because of their low cost and adaptability to a variety of applications are in wide use in a number of diverse industries. These foamed plastics are available in a wide range of formulations and an end product may be chemically and mechanically tailored to a particular application by selective control over the components and the foaming reaction. A particularly useful foamed plastic is foamed polystyrene. Typically, foamed polystyrene sheet is produced by heat extrusion of free-flowing polystyrene beads in the presence of a heat-activated blowing or expanding agent, e.g., a hydrocarbon such as pentane, preferably in the presence also of a source of carbon dioxide, as is well known in the art. These beads may be expanded to as much as 60 times their original volume. The resulting foamed or expanded polystyrene has a cellular structure and may have a density as low as one pound per cubic foot. Conventional extrusion and forming techniques for rigid plastic foams include steps which give two distinct expansions of the plastic material. The first is a foaming expansion and occurs in the extrusion operation as the plastic leaves the die. The second occurs in the heating stage of the foaming operation.

Rigid plastic foams such as expanded polystyrene are characterized by low thermal conductivity, good structural strength, lightness and resiliecny. The material is frequently employed in the packing industry because of its low cost and relatively simple manufacture. The material offers very desirable characteristics of strength and resiliency useful in protecting packaged goods from shocks and the like. Typical applications of rigid plastic foams are in rectangular and circular trays made of thin plastic sheet and used to support meat in supermarket display cases, produce such as apples and pears on produce racks and cakes either with, or without an outer box. In order to be economically feasible, these trays must be in low cost and yet must display sufficient lateral strength to properly support the relatively fragile products. In order to promote the desired lateral stability for a thin ply of rigid foamed plastic, sheets of this type are frequently formed with stiffening ribs much like corrugations. However, even these ribs display objectionable lateral instability.

Accordingly, it is an object of the present invention to provide a improved method of manufacturing a foamed plastic product.

Another object of this invention is to provide a method of manufacturing rigid foamed plastic sheet products of improved lateral stability together.

Still another object of the invention is to provide a novel method for forming a bead about the edge of a rigid foam plastic sheet product.

A still further object of this invention is to provide a novel method for increasing the thickness of selected portions of rigid foam plastic products in sheet form.

More particularly this invention features the manufacturing of a foam plastic sheet product having a peripheral bead or enlargement formed by a third edge expansion of the plastic after the forming expansion has taken place. The invention also features a method for forming a bead or enlargement along the edge of a rigid plastic foam sheet product which method includes the steps of expanding a quantity of thermally activated foam plastic material to a predetermined thickness and subsequently applying additional heat to selected portions of the formed product to produce by a third expansion an increase in the thickness of the product at those portions. As applied to sheet products, the third expansion may be made about the edge of the article to form a bead which will increase the lateral stability of the product.

This invention also features the novel use of apparatus for both cutting and post-expanding a plurality of sheet products by means of stacking a number of formed or partly formed sheet articles and moving a heating element and the stack relative to one another so that heat applied about the edges will simultaneously cut the stack and edge expand the trimmed edges.

Figure 8:
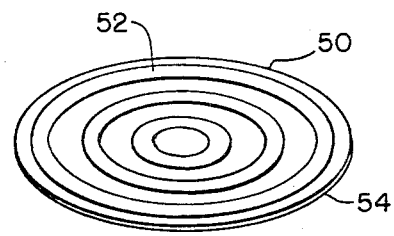
Figure 2:
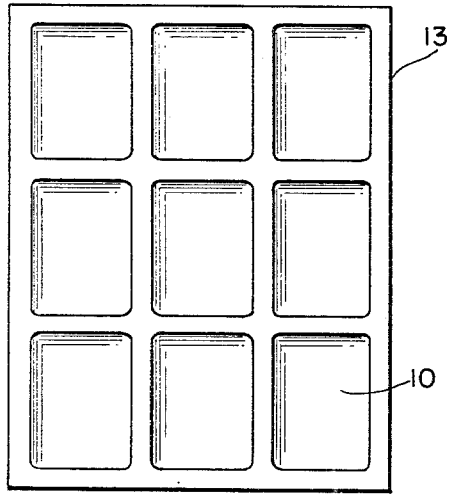
Figure 9:
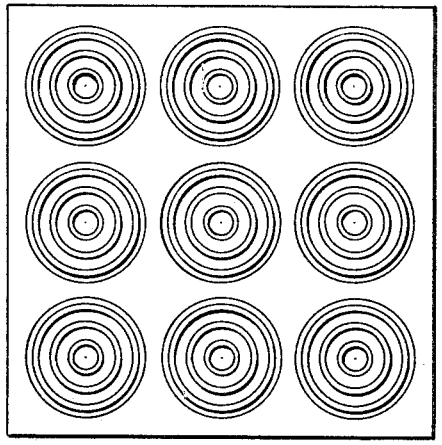
Figure 3:
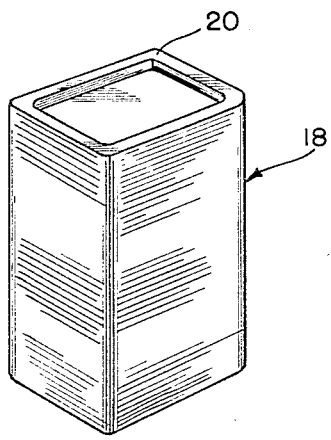
Figure 10:
Figure 4:
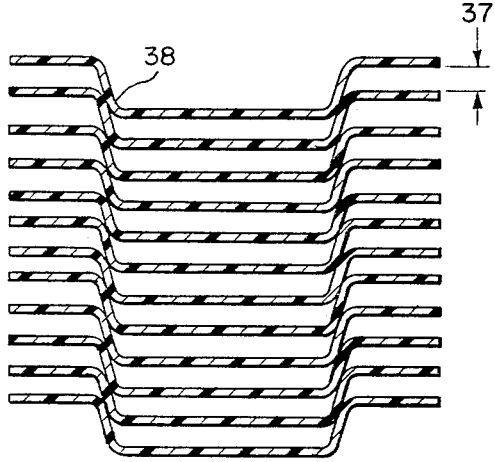
Figure 7:
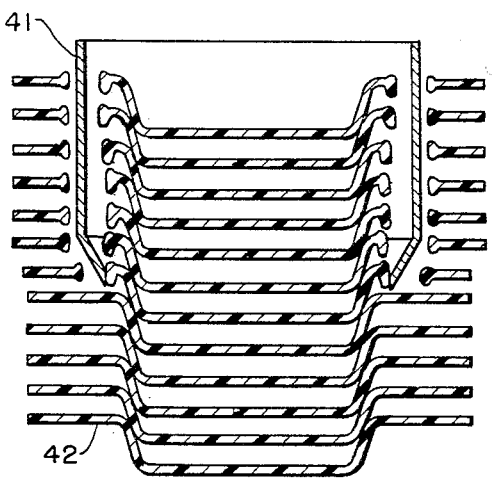
Figure 5:
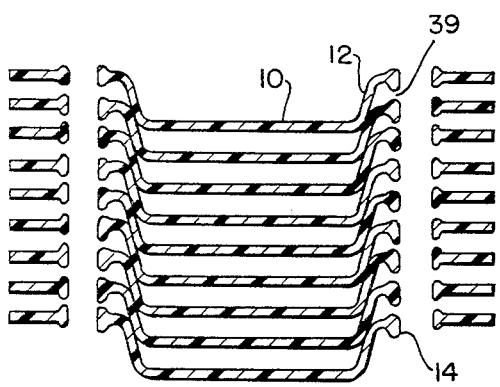
Figure 11:
Figure 12:
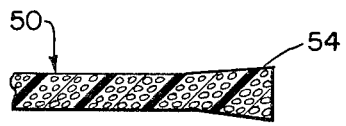
Figure 6:
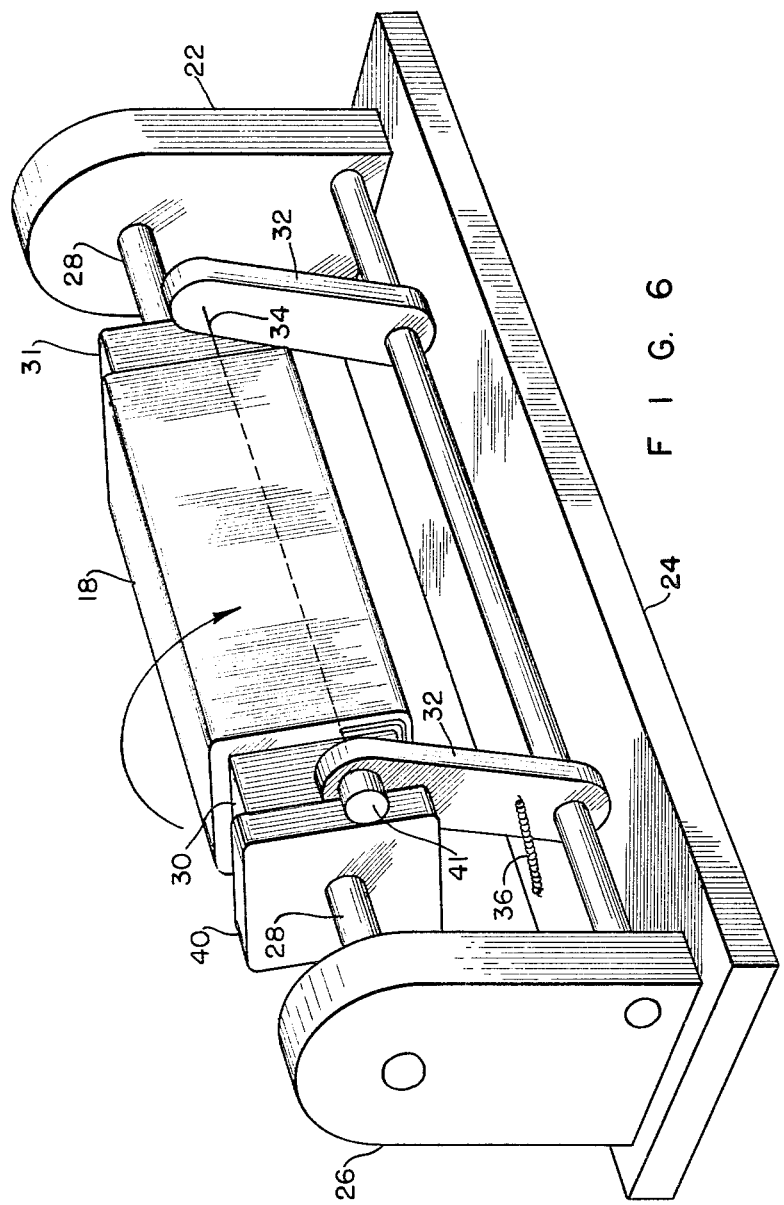

But these and other features of the invention, along with further objects and advantages thereof, will become more fully apparent from the following detailed description of preferred embodiments of the invention, with reference being made to the accompanying drawings in which:

FIG. 1 is a view in perspective of a rectangular rigid foamed plastic tray made according to the invention, FIG. 2 is a plan view of a rigid foamed plastic sheet embossed with a plurality of the trays of FIG 1, FIG. 3 is a view in perspective showing a stack of tray blanks cut from the FIG. 2 sheet, FIG. 4 is a sectional view in side elevation showing the stack of FIG. 3, FIG. 5 is a view similar to FIG. 4 but showing the stack after the edges of the trays have been expanded, FIG. 6 is a view in perspective of a lathe for cutting and expanding the edges of a stack of tray blanks, FIG. 7 is a sectional view in side elevation showing a mandrel for cutting and edge expanding a stack of trays, FIG. 8 is a view in perspective of a rigid foamed plastic disc made according to the invention, FIG. 9 is a top plan view of a rigid foamed plastic sheet embossed with a plurality of the discs of FIG. 8, FIG. 10 is a view in perspective showing a stack of discs cut from the FIG. 9 sheet, FIG. 11 is a detail section of an edge portion of a disc of the type shown in FIG. 8 but having a conventional configuration, and FIG. 12 is a detail section of an edge portion that has been edge expanded.

Referring now to FIG. 1 of the drawings, there is illustrated a rectangular cake tray 10 of rigid foamed plastic sheet material formed with an offset flange 12. The sheet employed in forming the tray is essentially of constant thickness in cross section.

The rigid foamed plastic employed in the tray may be one of a variety of foamed thermoplastics such as foamed polystyrene or foamed polypropylene, for example. In the illustrated embodiment, the tray is fabricated from foamed polystyrene which has been expanded into sheet form of a given thickness by an extrusion process or the like. Heretofore, trays of this type were die cut to the desired size and shape from a sheet 13 shown in FIG. 2 and this process caused the edges of the finished tray to be pinched in as shown in FIG. 11 where it will be seen that the opposing sides of the edge portion taper towards the edge so that the outer edge is substantially thinner than the remaining portion of the tray. This pinched edge substantially reduces the lateral stability of the finished tray. According to the present invention and as best shown in FIG. 5 for the rectangular tray and in FIG. 12 for the circular tray, the outer edge of the tray has been expanded so that the edge portion is substantially thicker than the remaining portion of the tray. This thickened portion or bead 14 extends about the periphery of the tray and provides greatly improved lateral stability of the tray. In the practice of this invention, the bead 14 is formed by controlled heating of the edge portion only of the tray 10, whereby the foamed plastic material constituting the edge portion undergoes a third or post-expansion and increases in thickness over the remaining portions of the tray.

Any plastic material which foams under the action of applied heat into a rigid or semi-rigid body may be employed in the practice of this invention. It is only necessary that the material be capable of undergoing at least three expansions, the first being to expand the raw plastic material into a sheet of a given thickness, the second being to expand the sheet during the forming stage heating and the third being to expand the formed article by applying heat around the edges.

In FIG. 3 there is shown a stack 18 of tray blanks 20 which have been cut from the sheet 13 illustrated in FIG. 2 by any conventional means such as die cutting or the like. All of the blanks in the stack 18 may be cut to the desired size and the edges of each simultaneously expanded by the use of the apparatus shown in FIG. 6. This apparatus comprises a base support 24, on which are mounted a tailstock 22, and a headstock 26, spaced from one another. The headstock 26 and the tailstock 22 include spindles 28 both able to be rotated together and plates 30 and 31 which are adapted to sandwich the stack 18 for rotation about a horizontal axis. Mounted also to the base support 24 is a pair of pivoted arms 32 spaced from one another and supporting therebetween a resistance heating wire 34. The arms together with the wire are urged normally inwards towards the stack by means of a spring 36 connected to the base support 24. Any other force mechanism such as an air cylinder or a weight pulley and string may be used in place of the spring. A cam plate 40 is profiled and a cam roller 41 is provided on the arm 32, to run against the contoured plate 40. As the drive heads 26 and 22 rotate the stack spindles 28, the contoured cam plate 40, and the plates 30 and 31, they also rotate the stack 18 which is to be cut. The contoured cam plate 40 imparts a motion to the cam roller 41, and to the arms 32, which move the wire in the desired path to cut the stack 18 to a variety of shapes such as rectangular, circular, oval, etc. It will be understood that the contoured plate 40 may be provided in a variety of shapes to accommodate the above configurations.

It will be understood that the resistance wire 34 is connected to a suitable variable power source so that the wire may be heated to a selected temperature. Thus, as the stack 18 is rotated against the heated wire, the wire will cut into the stack and cut away the excess material to leave a stack of finished trays 10. The hot wire 34, in addition to cutting out the trays from their individual squares, also applies sufficient heat to the peripheral edges of each of the trays so as to cause the edge portions to undergo a post expansion which will form the desired beads 14 and 54 such as shown in FIGS. 5 and 12 respectively. The apparatus shown in FIG. 6 may also be applied to form beads only on a stack of trays in the event that they have already been cut to size by a die cutting process or the like.

It will be understood that the speed of rotation and heat of the wire will control the cutting and post-expanding action of the foamed plastic. In cutting and forming a bead with the hot wire, it is desirable to start with the wire heated to between 600° and 1000° F. The speed of cutting will depend on the amount of power put into the wire and the hotter the wire the faster the cut may be made.

As noted above in connection with FIGS. 1–6, the preferred embodiment of this invention forms a plurality of trays 10 by treating a stack 18 of pre-cut blanks 20 held or clamped in a lathe-type apparatus such as that shown in FIG. 6. As shown in FIGS. 4 and 5, the formed portions of the trays touch at 38, while the horizontal flanges 12 are spaced apart at 37. Passage of the hot wire 34 through the stack 18 simultaneously cuts out the trays 10 and forms the beads 14. The rate of cutting, i.e., the length of time the hot wire contacts the edge, is coordinated with the initial density of the sheet 13 and the distance 37 between the opposing faces of adjacent edge portions of the stacked pre-cut blanks 20 so that heat is withdrawn before the expanding edges can fuse together at 39. Under these conditions, the edges 14 may be allowed to expand to such an extent that they lightly touch one another at 39 if one views the vertical edge of the resulting stack of cut out trays while they are still clamped together. It will be apparent that the particular operating conditions will vary but that they may be readily determined by routine experimentation for any given operation. By way of illustration, a stack of approximately 200 pre-cut blanks 20 were clamped in a lathe-type apparatus such as that shown in FIG. 6. These blanks 20 were formed from a sheet approximately .035 inch thick of biaxially oriented foamed polystyrene formed by extrusion from polystyrene beads using pentane and a carbon dioxide source as blowing agents. A resistance heating wire 34 approximately .025 inch thick was heated to a temperature of approximately 800° F. The stack 18 was rotated at a rate of approximately .60 feet per minute. After the trays were completely cut out, the stack of trays 10 was removed from the lathe-type apparatus and the trays readily separated from each other when the stack was unclamped. The bead 14 was found to be approximately .125 inch thick.

It will be seen from FIG. 4 that in a stack of formed trays surfaces which are not horizontal may touch as at 38, leaving a space 37. It will be seen further from FIG. 5 which represents a stack of hot wire cut trays, that the edges of the trays have expanded to lightly touch each other at 39, filling the gap 37 of FIG. 4.

In addition to the use of a hot wire described above, a heated mandril 41, such as shown in FIG. 7 may be employed for simultaneously cutting foamed plastic trays to size, pushing the soft plastic to one side and expanding the edges of the trays. The mandril comprises a tubular cylinder, for example, the edges of which are sharpened to cut into a stack 42 of prefoamed plastic trays when the mandril is forced down over the stack. The mandril is heated to a temperature sufficient both to cut through the stack and to cause the desired post-expansion of the edges of the stacked trays. Thus, in one step, a stack of prefoamed partly formed trays is cut to size and their edges expanded into the desired bead. The mandril may also be employed to cause expansion only of a stack of pre-cut trays.

In addition to the bead forming techniques described above, a direct contact heating arrangement may be employed and this would involve merely the application of a heated surface directly to the edges of prefoamed plastic products so as to cause the contacted surface to undergo a second or post-expansion.

In general, the materials best adapted for the practice of this invention are rigid foamed thermoplastic plastics which are capable of further expansion. These foamed thermoplastic plastic materials have a closed cell structure, and the cells retain residual blowing agent (gas) or air; i.e., the cell contains a material which will expand upon the application of heat, and cause the plastic to expand when the temperature reaches the softening point of the plastic. Foamed polystyrene sheets are particularly useful. The preferred material is a biaxially oriented foamed polystyrene sheet which is initially stressed in two lateral directions. Heat from the heated wire (or mandril) raises the temperature in the edge portion. Application of heat above a critical temperature results in a relaxation of the biaxial stresses about the edges of the tray, causing the edges to retract to a certain extent. Plastic forming the periphery of the edge portion is drawn back towards the center portion of the tray, thus becoming part of the bead which is further enlarged by the post-expansion of the edge portion. It will be understood that a stack cut by any other means may be similarly edge expanded.

In the embodiment shown in FIGS. 8–12 a circular tray 50 is formed from the same sort of material employed in the principal embodiment. In this instance the tray 50 is formed with concentric corrugations 52 to enhance lateral stability and a peripheral bead 54 formed by edge expansion of the plastic by techniques described above.

While the invention has been described with particular reference to the illustrated embodiments, it will be understood that numerous modifications thereto will appear to those skilled in the art. For example, in addition to the trays described herein, the invention may be employed to advantage in fabricating other types of foamed plastic products where an enlargement over a selected portion of the product is desired.

Accordingly, the above description and accompanying drawings should be taken as illustrative of the invention and not in a limiting sense.

Having thus described the invention, what I claim and desire to obtain by Letters Patent of the United States is:

I claim:

1. A method of increasing the thickness of a selected portion of a rigid heat expandable prefoamed plastic sheet, comprising the step of heating the selected portion only of said sheet sufficiently to cause the material in the selected portion to undergo expansion, the remaining portions of said sheet being unheated and unpressured.

2. A method of forming a bead about the edge of a rigid heat expandable prefoamed plastic sheet, comprising the step of heating the edge portion only of said sheet sufficiently to cause the material in the edge portion to undergo expansion, the remaining portion of said sheet being unheated and unpressured.

3. The method of shaping a plurality of prefoamed heat expandable plastic sheet products and simultaneously forming a bead about the edge portion thereof, comprising the steps of
   (a) stacking a plurality of prefoamed heat expandable sheet blanks,
   (b) moving a heated cutting element and the stacked blanks relative to one another in a path defining the edges of said products, and
   (c) maintaining said element at a temperature which, in relation to the relative speed of movement of the stacked blanks, will cut through said blanks and will cause edge expansion along the cut edges of the blanks.

4. The method of forming rigid foamed polystyrene trays and the like, comprising the steps of
   (a) forming a plurality of rigid foamed heat expandable polystyrene sheet blanks, each of said blanks having substantially identical corrugations formed therein, the cells of said foamed polystyrene containing a heat expandable gas,
   (b) forming a stack of said blanks, the edges of said blanks being spaced apart by said corrugations,
   (c) moving said stacked blanks and a heated wire relative to one another in a path, defining the edges of said trays,
   (d) maintaining said heated wire at a temperature which, in relation to the relative speed of movement of said stacked blanks, will cut through said blanks and simultaneously cause the edges of said trays to expand without fusing with the edge of the next adjacent trays, thereby simultaneously cutting said trays out of said blanks and providing said trays with bead edges, and
   (e) separating said cut out trays from each other.

References Cited

UNITED STATES PATENTS

| | | | |
|---|---|---|---|
| 2,677,747 | 5/1954 | Jaye | 264—163 X |
| 2,964,799 | 12/1960 | Roggi et al. | 264—47 |
| 3,170,974 | 2/1965 | Jacobs | 264—321 X |
| 3,187,380 | 6/1965 | Harrison. | |
| 3,301,935 | 1/1965 | Stoeckhert | 264—321 |
| 3,315,018 | 4/1967 | Commeyras | 264—321 X |

OTHER REFERENCES

Collins, F. H., "Controlled Density Polystyrene Foam Extrusion." In SPE Journal, July 1960, pp. 705–709.

ALEXANDER H. BRODMERKEL, *Primary Examiner.*

RAPHAEL H. SCHWARTZ, *Examiner.*

P. E. ANDERSON, *Assistant Examiner.*